(12) United States Patent
Biesenbach et al.

(10) Patent No.: US 9,106,123 B2
(45) Date of Patent: Aug. 11, 2015

(54) METHOD FOR PRODUCING A CAGE ROTOR FOR AN ASYNCHRONOUS MACHINE

(75) Inventors: Martin Biesenbach, Düsseldorf (DE); Ralf Bode, Moers (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 142 days.

(21) Appl. No.: 13/699,023

(22) PCT Filed: May 24, 2011

(86) PCT No.: PCT/EP2011/058500
§ 371 (c)(1),
(2), (4) Date: Nov. 20, 2012

(87) PCT Pub. No.: WO2011/147846
PCT Pub. Date: Dec. 1, 2011

(65) Prior Publication Data
US 2013/0062987 A1    Mar. 14, 2013

(30) Foreign Application Priority Data

May 25, 2010  (DE) .......................... 10 2010 021 470

(51) Int. Cl.
*H02K 15/02*   (2006.01)
*H02K 17/16*   (2006.01)
(52) U.S. Cl.
CPC .............. *H02K 17/165* (2013.01); *H02K 15/02* (2013.01); *Y10T 29/49012* (2015.01)
(58) Field of Classification Search
CPC .......................... H02K 15/0012; H02K 17/165
USPC ...................... 29/596–598; 310/42, 156, 211, 310/216.069, 86; 164/109, 112, 211, 332
See application file for complete search history.

(56) References Cited

U.S. PATENT DOCUMENTS

| | | | |
|---|---|---|---|
| 1,650,795 A | 11/1927 | Johnson | |
| 2,265,333 A | 12/1941 | Wry | |
| 5,758,709 A * | 6/1998 | Boyd, Jr. | ........................ 164/109 |
| 6,058,596 A * | 5/2000 | Jansen et al. | .................. 310/211 |
| 6,088,906 A | 7/2000 | Franco-Ferreira | |

(Continued)

FOREIGN PATENT DOCUMENTS

| | | |
|---|---|---|
| CN | 1452293 A | 10/2003 |
| CN | 1297389 C | 1/2007 |

(Continued)

*Primary Examiner* — Minh Trinh

(57) ABSTRACT

A method for producing a cage rotor for an asynchronous machine is provided. The method includes providing a rotor body having a conductor bar segment in which conductor bars are provided, producing conductor bar slots in the conductor bar segment, wherein one conductor bar slot is provided for each of the conductor bars and producing short circuit ring recesses for short circuit rings, wherein the conductor bar slots each open into the short circuit ring recesses, pressure die casting cage material in the conductor bar slots, in situ, so that the conductor bars are formed of the conductor bar material in the conductor bar slots and the short circuit rings are formed in the short circuit ring recesses, and generating an area in the conductor bar material and the rotor body material including a metallurgical bond between the conductor bar material and the rotor body material at interfaces between the conductor bars and the rotor body.

4 Claims, 2 Drawing Sheets

(56) References Cited

U.S. PATENT DOCUMENTS

| | | | |
|---|---|---|---|
| 8,344,581 B2 * | 1/2013 | Yabe et al. | 310/216.069 |
| 8,575,813 B2 * | 11/2013 | Kleber et al. | 310/211 |
| 8,745,848 B2 * | 6/2014 | Lang | 29/598 |
| 8,847,449 B2 * | 9/2014 | Biesenbach et al. | 310/86 |
| 2007/0290569 A1 | 12/2007 | Graf | |

FOREIGN PATENT DOCUMENTS

| | | |
|---|---|---|
| DE | 19736790 A1 | 2/1999 |
| DE | 19746195 A1 | 4/1999 |
| JP | 2001211615 A | 8/2001 |
| WO | WO 2005124973 A1 | 12/2005 |
| WO | WO 2010052226 A1 | 5/2010 |

* cited by examiner

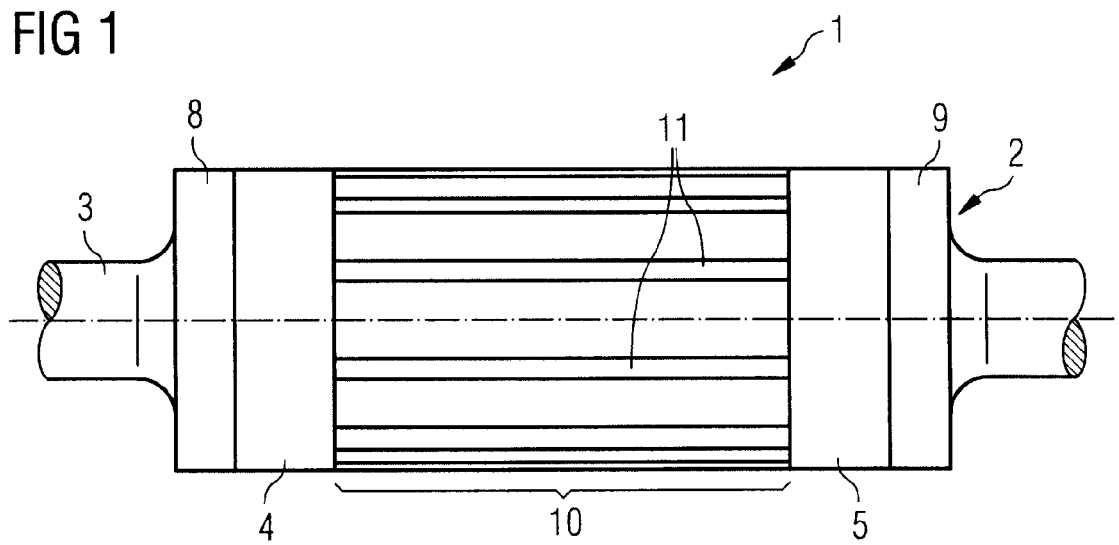
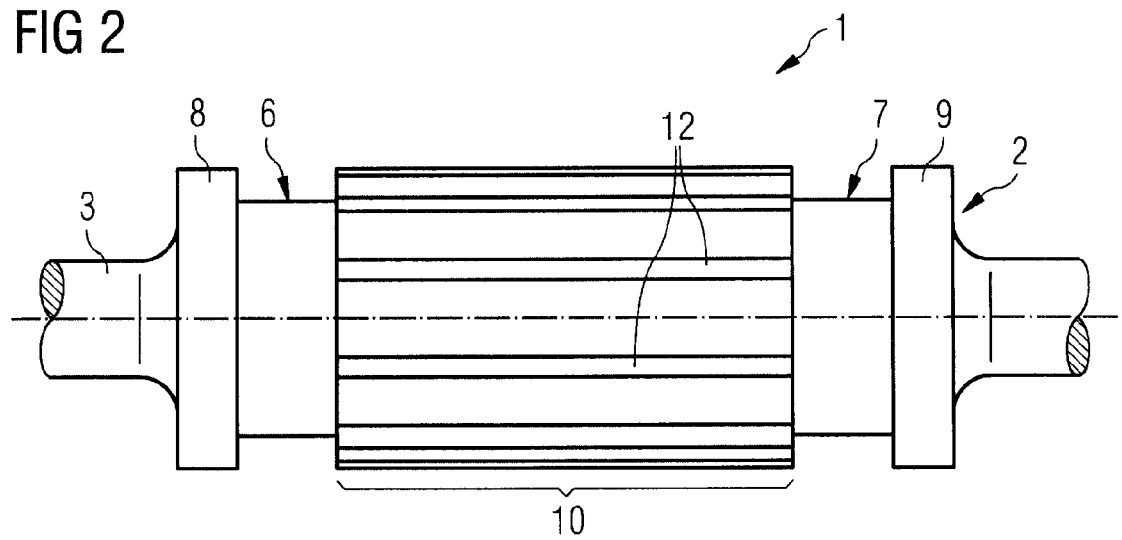

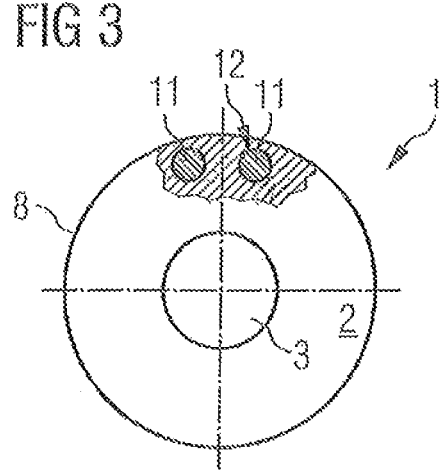
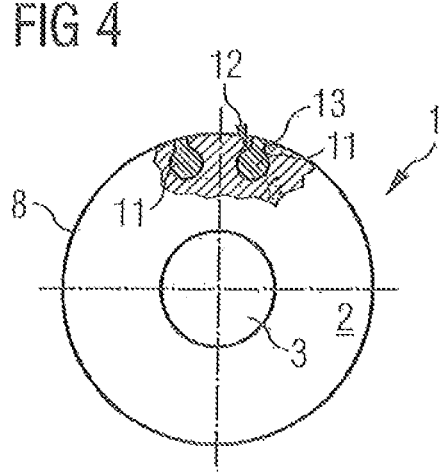
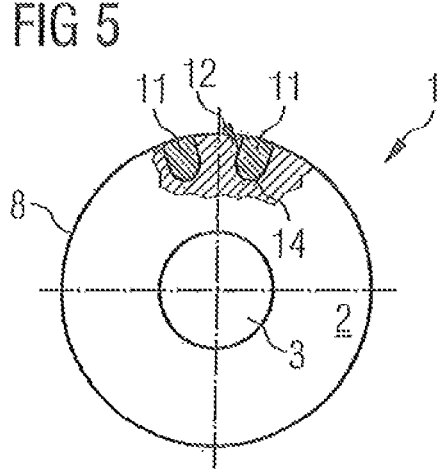

METHOD FOR PRODUCING A CAGE ROTOR FOR AN ASYNCHRONOUS MACHINE

CROSS REFERENCE TO RELATED APPLICATIONS

This application is the U.S. National Stage of International Application No. PCT/EP2011/058500, filed May 24, 2011 and claims the benefit thereof. The International Application claims the benefits of German application No. 10 2010 021 470.1 DE filed May 25, 2010. All of the applications are incorporated by reference herein in their entirety.

FIELD OF INVENTION

Detailed Description of Invention

The invention relates to a cage rotor for an asynchronous machine and to a method for producing the cage rotor.

BACKGROUND OF INVENTION

An asynchronous machine, such as for example an asynchronous motor or an asynchronous generator, has a cage rotor with a plurality of conductor bars, which are arranged lying next to one another on the circumference of the cage rotor and extending in the axial direction. At their longitudinal ends, the conductor bars are connected to one another in an electrically conducting manner respectively by a short-circuiting ring. In the case of asynchronous machines from a certain power class, circumferential speeds that may be around 250 m/s occur at the cage rotor. With these high circumferential speeds, the strength of the cage rotor has to meet particular requirements, it being known to form the cage rotor with a solid type of construction. The cage rotor has a rotor body, which has longitudinal slots which are distributed uniformly over the circumference and in which the conductor bars are placed. The conductor bars are conventionally produced from copper, silver or aluminum alloys, whereas the rotor cage is conventionally produced from steel.

During the operation of the asynchronous machine, the conductor bars in particular are subjected to a centrifugal force, which may be so high that the conductor bars are lifted out of the conductor bar slots. To remedy this, conventionally a positive connection is provided between the conductor bars and the rotor body. This is achieved, for example, by the conductor bars being arranged in the rotor body and produced such that the conductor bars are undercut by the material of the rotor body in the radial direction. Consequently, a positive connection is produced between the conductor bars and the rotor body, but it is subjected to fatigue and/or creep, in particular when the asynchronous machine is undergoing starting-up and running-down operations.

JP 2001 211615 A describes a rotor with a cage, wherein the cage is produced by hot-isostatic pressing of a powder. WO 2005/124973 A1 discloses a method for producing a rotor in which conductive bars are positioned in longitudinal grooves and are subsequently pressure-treated and heat-treated.

SUMMARY OF INVENTION

The object of the invention is to provide a cage rotor for an asynchronous machine and a method for producing the cage rotor, wherein the cage rotor has a high strength and a high electromagnetic efficiency.

The method according to the invention for producing a cage rotor for an asynchronous machine comprises the steps of: providing a rotor body having a conductor bar segment, in which a plurality of conductor bars are provided; producing conductor bar slots in the conductor bar segment, wherein one of the conductor bar slots is provided for each of the conductor bars, and producing short-circuiting ring recesses for short-circuiting rings, wherein the conductor bar slots respectively open out into the short-circuiting ring recesses; diecasting cage material into the conductor bar slots in situ, so that the conductor bars are formed in the conductor bar slots by the conductor bar material and the short-circuiting rings are formed in the short-circuiting ring recesses; creating in the conductor bar material and the rotor body material a region that has a metallurgical bond between the conductor bar material and the rotor body material at interfaces between the conductor bars and the rotor body, wherein the metallurgical bond is formed such that, at the interfaces, the conductor bars are retained in the conductor bar slots during the operation of the cage rotor and the short-circuiting rings are retained in the short-circuiting ring recesses. The cage rotor according to the invention that is produced by the method has a rotor body, which has a conductor bar segment, which has a plurality of conductor bar slots with conductor bars respectively fitted therein, wherein the conductor bar slots are respectively formed by two slot flanks arranged parallel to one another and a slot root extending between the slot flanks.

The provision of the conductor bar slots means that the rotor body is prepared as a blank and can be placed into a corresponding casting mold. Then, by means of a diecasting process, the conductor bar material is introduced into the conductor bar slots, so that the cage rotor is produced in situ. The metallurgical bond is formed between the conductor bar material and the rotor body material at the interfaces between the conductor bars and the rotor body, so that a direct metallic bond of the conductor bars to the rotor body is established. As a result, the conductor bars are stably retained in the conductor bar slots, so that there is no need to provide an additional positive connection between the conductor bars and the rotor body, for instance in the form of a dovetail profile. This allows the cross section of the conductor bars to be formed as desired in principle, and consequently optimized with regard to the electrical properties of the cage rotor. By avoiding the positive connection between the conductor bars and the rotor body, fatigue or creep of the cage body in the region of the conductor bar slots is prevented, so that the cage rotor has a high strength.

The region with the metallurgical bond is preferably a diffusion region, in which the conductor bar material and the cage material diffuse into one another. In this respect it is preferred that, for the interdiffusion of the conductor bar material and the rotor body material, an adhesion-promoting layer is respectively provided in the conductor bar slots before the diecasting. The adhesion-promoting layer is preferably chosen such that the interdiffusion of the conductor bar material and the rotor material is brought about by the diecasting. Alternatively, it is preferred that the adhesion-promoting layer is chosen such that the interdiffusion of the cage material and the rotor body material is intensified by hot-isostatic pressing. The conductor bars and the short-circuiting rings are preferably of copper and the adhesion-promoting layer preferably contains nickel. Alternatively, it is preferred that the conductor bars and the short-circuiting rings are of aluminum and the adhesion-promoting layer contains zinc.

With regard to the optimized electrical properties, each slot root is convexly formed, so that the conductor bars are preferably rounded off respectively on their radially inner side, to form a conductor bar back. In this respect it is preferred that the cross sections of the conductor bars are formed wider in the radial direction than in the circumferential direction. This configuration gives the rotor body optimized electromagnetic properties, whereby the electromagnetic efficiency of the cage rotor is high.

BRIEF DESCRIPTION OF THE DRAWINGS

Preferred exemplary embodiments of a cage rotor according to the invention are explained below on the basis of the accompanying schematic drawings, in which:

FIG. 1 shows a plan view of a cage rotor according to the invention,

FIG. 2 shows a plan view of the cage rotor from FIG. 1 without conductor bars and short-circuiting rings and FIGS. 3 to 5 show cross sections of the cage rotor from FIG. 1 with various embodiments of conductor bars.

As can be seen from FIGS. 1 and 2, a cage rotor 1 according to the invention comprises a rotor body 2, which may be mounted rotatably by a shaft 3 in an asynchronous machine, for example an asynchronous motor or an asynchronous generator. The rotor body 2 is cylindrically formed and has on its outer circumference a first short-circuiting ring 4 and a second short-circuiting ring 5. The short-circuiting rings 4, 5 are respectively accommodated in a short-circuiting ring recess 6, 7, which is respectively formed by a first web 8, arranged on an end face, and a second web 9, lying opposite the first web 8. Provided between the short-circuiting ring recesses 6, 7 is a conductor bar segment 10, in which conductor bars 11 are fitted. The conductor bars 11 are distributed uniformly over the circumference of the rotor body 2 and connected by their longitudinal ends in an electrically conducting manner respectively to the short-circuiting rings 4, 5. In the conductor bar segment 10 there is provided for each conductor bar 11 a conductor bar slot 12, placed in which is the conductor bar 11 assigned to it.

In FIGS. 3 to 5, various embodiments of cross sections of the conductor bars 11 are shown. According to FIG. 3, the conductor bars 11 are formed circularly in cross section and are fitted in the rotor body 2 such that they are completely enclosed by the material of the rotor body 2. The conductor bars 11 according to FIG. 4 differ from the conductor bars 11 according to FIG. 3 to the extent that on their outer circumference there is respectively provided a conductor bar web 13, with which the conductor body material has penetrated to the outer surface of the rotor body 2. According to FIG. 5, the conductor bars 11 are formed rectangularly in their cross sections, wherein a convex conductor bar back 14 is formed on the radially inner sides of the conductor bars 11. The cross sections of the conductor bars 11 are formed such that they are shorter in their extent in the circumferential direction than in their extent in the radial direction, wherein the conductor bars 11 finish flush with the cylindrical outer side of the conductor bar segment 10.

The rotor body 2 is produced as follows: firstly, a blank of the rotor body 2 has to be produced, by producing the rotor body 2 as a cylinder with a shaft 3 built onto it at the end face. The short-circuiting ring recesses 6 have to be provided in the blank, wherein the first web 8 and the second web 9 are formed at the short-circuiting ring recesses 6, 7. Between the short-circuiting ring recesses 6, 7, the conductor bar segment 10 is produced as a cylindrical segment of the rotor body 2. Then, the conductor bar slots 12 are introduced into the rotor body 2. After that, the rotor body 2 is placed into a casting mold, wherein cage material is introduced into the individual conductor bar slots 12 and into the short-circuiting ring recesses 6, 7 in situ by diecasting, so that the conductor bars 11 are formed in the conductor bar slots 12 by the conductor bar material and the short-circuiting rings 4, 5 are formed in the short-circuiting ring recesses 6, 7. During the diecasting, a region that has a metallurgical bond between the conductor bar material and the rotor body material is formed in the conductor bar material and the rotor material at the interfaces between the conductor bars 11 and the rotor body 2. The metallurgical bond is formed such that, at the interfaces, the conductor bars 11 are retained in the conductor bar slots 12 during the operation of the cage rotor 1 and the short-circuiting rings 4, 5 are retained in the short-circuiting ring recesses 6, 7. During the diecasting, the region with the metallurgical bond forms as a diffusion region, by the conductor bar material and the rotor body material diffusing into one another.

Before the diecasting, an adhesion-promoting layer may be respectively provided in the conductor bar slots 12 for the interdiffusion of the conductor bar material and the rotor body material. The adhesion-promoting layer has the effect that the interdiffusion of the cage material and the rotor material 2 takes place during the diecasting. After the diecasting, the interdiffusion at the surfaces of the cage components, the conductor bars 11 and the short circuiting rings 4, 5, and the rotor body material may be intensified by a hot-isostatic pressing process.

If the conductor bars are of copper, the adhesion-promoting layer contains nickel. If, on the other hand, the conductor bars are of aluminum, the adhesion-promoting layer contains zinc.

The invention claimed is:

1. A method for producing a cage rotor for an asynchronous machine, comprising:
   providing a rotor body having a conductor bar segment, in which a plurality of conductor bars are provided;
   producing a plurality of conductor bar slots in the conductor bar segment, wherein one of the conductor bar slots is provided for each of the conductor bars;
   producing a plurality of short-circuiting ring recesses for a plurality of short-circuiting rings, wherein the conductor bar slots respectively open out into the short-circuiting ring recesses;
   diecasting cage material into the conductor bar slots in situ, so that the conductor bars are formed in the conductor bar slots by the conductor bar material and the short-circuiting rings are formed in the short-circuiting ring recesses; and
   creating in the conductor bar material and the rotor body material a region that has a metallurgical bond between the conductor bar material and the rotor body material at interfaces between the conductor bars and the rotor body,
   wherein the region with the metallurgical bond is a diffusion region, in which the cage material and the rotor body material diffuse into one another, and, for the interdiffusion of the conductor bar material and the rotor body material, an adhesion-promoting layer is respectively provided in the conductor bar slots before the diecasting, being chosen such that the interdiffusion of the conductor bar material and the rotor body material is brought about by the diecasting, whereby the metallurgical bond is formed such that, at the interfaces, the conductor bars are retained in the conductor bar slots during the operation of the cage rotor and the short-circuiting rings are retained in the short-circuiting ring recesses.

2. The method as claimed in claim 1, wherein the adhesion-promoting layer is chosen such that the interdiffusion of the cage material and the rotor body material is intensified by hot-isostatic pressing.

3. The method as claimed in claim 1, wherein the conductor bars and the short-circuiting rings comprise copper and the adhesion-promoting layer comprises nickel.

4. The method as claimed in claim 1, wherein the conductor bars and the short-circuiting rings comprise aluminum and the adhesion-promoting layer comprises zinc.

* * * * *